(12) United States Patent
De Martino et al.

(10) Patent No.: US 10,217,546 B2
(45) Date of Patent: Feb. 26, 2019

(54) POWER CABLE HAVING AN ALUMINUM CORROSION INHIBITOR

(71) Applicants: PRYSMIAN S.p.A., Milan (IT); POLITECNICO DI MILANO, Milan (IT)

(72) Inventors: Pamela De Martino, Milan (IT); Ehsan Fallahmohammadi, Milan (IT); Attilio Citterio, Milan (IT); Lidia Terruzzi, Milan (IT)

(73) Assignees: PRYSMIAN S.p.A., Milan (IT); POLITECNICO DI MILANO, Milan (IT)

( * ) Notice: Subject to any disclaimer, the term of this patent is extended or adjusted under 35 U.S.C. 154(b) by 0 days.

(21) Appl. No.: 15/760,791

(22) PCT Filed: Sep. 25, 2015

(86) PCT No.: PCT/EP2015/072081
§ 371 (c)(1),
(2) Date: Mar. 16, 2018

(87) PCT Pub. No.: WO2017/050387
PCT Pub. Date: Mar. 30, 2017

(65) Prior Publication Data
US 2018/0254123 A1 Sep. 6, 2018

(51) Int. Cl.
*H01B 7/02* (2006.01)
*H01B 7/28* (2006.01)
(Continued)

(52) U.S. Cl.
CPC ......... *H01B 7/2806* (2013.01); *C08K 5/3472* (2013.01); *C23F 11/149* (2013.01);
(Continued)

(58) Field of Classification Search
CPC ........ H01B 3/185; H01B 3/305; H01B 3/421; H01B 7/2806; H01B 7/2825
(Continued)

(56) References Cited

U.S. PATENT DOCUMENTS

| 4,873,139 A | 10/1989 | Kinosky |
| 5,744,069 A | 4/1998 | Maeda et al. |

(Continued)

FOREIGN PATENT DOCUMENTS

| EP | 1 457 996 A2 | 9/2004 |
| EP | 1 457 996 A3 | 9/2004 |

(Continued)

OTHER PUBLICATIONS

International Search Report dated Jun. 20, 2016 in PCT/EP2015/072081, 3 pages.

(Continued)

*Primary Examiner* — William H Mayo, III
(74) *Attorney, Agent, or Firm* — Oblon, McClelland, Maier & Neustadt, L.L.P.

(57) ABSTRACT

A power cable having a metallic electrical conductor surrounded by one or more semiconductive layer and more or more insulating layer, wherein the cable has at least one metallic element made of aluminum, having a corrosion inhibitor provided in direct contact with the at least one metallic element made of aluminum.

12 Claims, 2 Drawing Sheets

(51) Int. Cl.
| | |
|---|---|
| *C23F 11/14* | (2006.01) |
| *H01B 7/282* | (2006.01) |
| *C08K 5/3472* | (2006.01) |
| *H01B 3/18* | (2006.01) |
| *H01B 3/30* | (2006.01) |
| *H01B 3/42* | (2006.01) |

(52) U.S. Cl.
CPC ........... *H01B 7/282* (2013.01); *H01B 7/2825* (2013.01); *H01B 3/185* (2013.01); *H01B 3/305* (2013.01); *H01B 3/421* (2013.01); *Y02A 30/14* (2018.01)

(58) Field of Classification Search
USPC ........ 174/102 R, 103, 105, 106 R, 107, 108, 174/109, 110 R
See application file for complete search history.

(56) References Cited

U.S. PATENT DOCUMENTS

| | | | |
|---|---|---|---|
| 6,596,393 | B1 | 7/2003 | Houston et al. |
| 6,903,263 | B2 * | 6/2005 | Perego .................... H01B 3/441 174/110 R |
| 2002/0127401 | A1 * | 9/2002 | Perego .................. C08F 255/02 428/375 |
| 2004/0007308 | A1 | 1/2004 | Houston et al. |
| 2004/0222009 | A1 * | 11/2004 | Blew ....................... H01B 3/441 174/110 F |
| 2005/0016755 | A1 | 1/2005 | Martinez et al. |
| 2010/0288528 | A1 * | 11/2010 | Houston ............. H01B 11/1895 174/102 R |
| 2015/0152329 | A1 | 6/2015 | Seetharaman et al. |

FOREIGN PATENT DOCUMENTS

| | | | |
|---|---|---|---|
| WO | WO 01/82312 | A1 | 11/2001 |
| WO | WO 02/03398 | A1 | 1/2002 |
| WO | WO 02/27731 | A1 | 4/2002 |
| WO | WO02/03398 | A * | 10/2002 ............... H01B 3/44 |
| WO | WO 2004/066318 | A1 | 8/2004 |
| WO | WO 2007/048422 | A1 | 5/2007 |
| WO | WO 2008/058572 | A1 | 5/2008 |
| WO | WO 2013/091723 | A1 | 6/2013 |

OTHER PUBLICATIONS

K. F. Khaled, et al., "The Inhibitive Effect of Some Tetrazole Derivatives Towards A1 Corrosion in Acid Solution: Chemical, Electrochemical and Theoretical Studies" Materials Chemistry and Physics, Elsevier, vol. 113, No. 1, XP025694728, Jan. 15, 2009, pp. 150-158.

"Aluminium and Corrosion" UK Aluminium Industry Fact Sheet 2, ALFED, Sep. 6, 2011, pp. 1-5 and cover page.

F. Zucchi, et al., "Tetrazole Derivatives as Corrosion Inhibitors for Copper in Chloride Solutions" Corrosion Science, Pergamon, vol. 38, No. 11, May 1996, pp. 2019-2029.

I. V. Tselinski, et al., "Synthesis and Reactivity of Carbohydroximoyl Azides: I. Aliphatic and Aromatic Carbohydroximoyl Azides and 5-Substituted 1-Hydroxytetrazoles Based Thereon" Russian Journal of Organic Chemistry, vol. 37, No. 3, 2001, pp. 430-436.

* cited by examiner

POWER CABLE HAVING AN ALUMINUM CORROSION INHIBITOR

FIELD OF THE INVENTION

The present invention relates to cable for power transmission/distribution. In particular, the present invention relates to a power cable comprising at least one aluminium element.

BACKGROUND OF THE INVENTION

Power cables may be used for both direct current (DC) or alternating current (AC) transmission or distribution.

Cables for power transmission or distribution at medium voltage (MV) or high voltage (HV) generally are provided with a cable core comprising a metallic electric conductor (usually aluminium or copper) surrounded by—from the radially innermost layer to the radially outermost layer—an inner semiconductive layer and an insulating layer. The cable core is further surrounded by an outer semiconductive layer, a metal screen (usually aluminium or copper) and an outer sheath.

In the present description, the term "medium voltage" is used to refer to a voltage typically from about 1 kV to about 30 kV and the term "high voltage" refers to a voltage above 30 kV.

Aluminium has the advantage of being lighter and cheaper than copper, but it is prone to oxidation and corrosion in the presence of water/moisture, thus cables comprising aluminium elements should be endowed with a moisture or water barrier to prevent water penetrating and reaching the aluminium element/s.

As a moisture or water barrier, a longitudinally sealed sheet of metal or plastic/metal laminate can be provided around the core/s. The metal can be aluminium. In the case of a laminate, the plastic layer is generally positioned facing towards the outer jacket of the cable and in contact thereto.

Diverse problems can arise due to water contacting the cable core, and then the penetration of water into cables, and stagnation therein, is an event that should be avoided. After manufacturing, cables are usually stored and shipped with protection caps on their heads.

However, the penetration and stagnation of water within the cable core can occur despite the above precautions. In particular, water penetration and stagnation cannot be excluded during installation, for example due to negligence of the installing personnel, but also through any defect in the polymeric sheath of the power cable which exposes the cable aluminium parts to the environment.

Components involved in the corrosion issue depend on cable type. A non exhaustive list can include: screen wires, equalizing tape, water barrier, sheets, etc.

In the presence of water, aluminium is known to form a protective oxide film stable within a wide pH range, from about 4 to 8 (see, e.g., Aluminium Corrosion, UK Aluminium Industry Fact Sheet 2 by ALFED, www.alfed.org.uk).

As reported by Khaled et al., "The inhibitive effect of some tetrazole derivatives towards Al corrosion in acid solution: Chemical, electrochemical and theoretical studies", Materials Chemistry and Physics, 113, 2009, pp. 150-158, aluminium protective oxide film is amphoteric and dissolves substantially when the metal is exposed to high concentrations of acids or bases. Under these circumstances, corrosion inhibitors should be used because the solubility of the oxide film increases above and below pH range of from 4 to 8 and aluminium exhibits uniform attack. Inhibitors are used to prevent metal dissolution.

Khaled et al. relates to corrosion inhibition of aluminium in a solution of hydrochloric acid 1.0M in the absence and presence of different concentrations of tetrazole derivatives namely, 1-phenyl-1H-tetrazole-5-thiol (A), 1-phenyl-1H-tetrazole (B), 1H-tetrazol-5-amine (C), 1H-tetrazole (D). The reduction in the dissolution of aluminium in the presence of these tested compounds was attributed to the sulphur atom present in the thio group found in compound A as well as to the amino group and the heterocyclic rings.

Tetrazole compounds have been reported in other literature and patent references to have inhibiting action on the corrosion of other non-ferrous metals, such as silver and copper.

Among them, F. Zucchi et al., "Tetrazole Derivatives as Corrosion Inhibitors for Copper in Chloride Solutions", Corrosion Science, Vol. 38, No. 11, pp. 2019-2029, 1996 relates to the inhibiting action of some tetrazole derivatives on the copper corrosion in chloride solutions. Among the tested derivatives, 5-phenyl-tetrazole (5Ph-T) and 5-mercapto-1-phenyl-tetrazole (5Mc-1 Ph-T) decrease their inhibiting ability at 80° C. The polarisation conductance data demonstrate that only 5Mc-1 Ph-T is able to maintain its protective characteristics for almost 60' at 40° C.

U.S. Pat. No. 5,744,069 relates to a water soluble metal anticorrosive agent comprising certain tetrazole compounds for non-ferrous metals such as copper, copper alloys and super-hard alloys. The water soluble metal anticorrosive agent comprising a tetrazole compound is represented by the following formula (A):

(A)

wherein R1 and R2 each indicate hydrogen, an alkyl group having 1 to 20 carbon atoms, a cycloalkyl group, a phenyl group, an alkylphenyl group, an amino group, a mercapto group or an alkylmercapto group.

U.S. Pat. No. 4,873,139 relates to a technique for imparting corrosion resistance to silver and copper surfaces by contacting such surfaces with 1-phenyl-1H-tetrazole-5-thiol.

DESCRIPTION OF THE INVENTION

The Applicant has observed that in cable applications corrosion phenomena of aluminium can occur even within the above mentioned pH range of from 4 to 8. In particular, the Applicant has observed that these corrosion phenomena are as serious as to jeopardize the integrity of the aluminium component(s). Furthermore, the development of hydrogen due to the corrosion of the aluminium can give rise to dangerous situations, in addition to compromising the functionality of the power cable.

Without wishing to be bound by a theory, the Applicant hypothesized that this corrosion phenomenon of the aluminium may be mainly due to three redox mechanisms, caused by the peculiar construction of the power cables.

Such redox mechanisms are (i) a reaction of oxidation-reduction, in the event of water penetration, at the air/water interface on the surface of the aluminium, (ii) a reaction of oxidation-reduction due to a galvanic coupling between aluminium and carbon black from an adjacent semiconductive layer or a carbon black loaded water absorbing tape, where aluminium behaves as a sacrificial anode, and (iii) a reaction of oxidation-reduction due to a galvanic coupling between aluminium and copper, where the aluminium still behaves like a sacrificial anode.

The Applicant also observed that in the presence of a substantial lack of oxygen within the cable a sufficient formation of the protective layer of aluminium oxide cannot be obtained.

The Applicant faced the problem of avoiding the phenomena of aluminium corrosion in power cable, in particular within the above mentioned pH range of from 4 to 8.

In addition, taking into account the operation conditions of a power cable, a suitable inhibitors of the aluminium corrosion in a power cable should exert its function for prolonged time period (in the order of, at least, months) and at temperatures greater than 30° C.

SUMMARY OF THE INVENTION

The Applicant found that the above problem can be solved by providing power cables comprising an aluminium component with a corrosion inhibitor in direct contact with the aluminium component, the corrosion inhibitor having at least one hydroxyl-tetrazole moiety linked to a cycloaromatic moiety.

A possible theoretical interpretation is that while hydroxyl-tetrazole moiety appears suitable for interacting with metallic aluminium, a cycloaromatic group could provide a hydrophobic shield against water. The combination of the two moieties can impart the compound of formula (I) with a corrosion inhibiting capacity suitable for protecting the aluminium parts of a power cable for prolonged period and at temperatures substantially greater than the room one.

Accordingly, in a first aspect, the present invention relates to a power cable comprising a metallic element made of aluminium, wherein a corrosion inhibitor is provided in direct contact with the metallic element, the corrosion inhibitor having the general formula (I):

R1-Ar-R2  (I)

wherein R1 is a 1-hydroxy-tetrazol-5-yl group a 2-hydroxy-tetrazol-5-yl group, 1-acryloxy-tetrazol-5-yl group or 1-(2-carboxyethenyl)-tetrazol-5-yl group;

Ar is a monocyclic or bicyclic aromatic moiety; and

R2 is a hydrogen atom (H) or a 1-hydroxy-tetrazol-5-yl group, a 2-hydroxy-tetrazol-5-yl group, a hydroxyl group (OH), a vinyl group, an allyl group or a —O—CO—R4 group, where R4 is an alkenyl group having from 2 to 6 carbon atoms.

When Ar is a monocyclic aromatic moiety and R2 is different from hydrogen atom, R1 and R2 are in ortho, meta, or para position with respect to each other.

When Ar is a bicyclic aromatic moiety and R2 is different from hydrogen atom, R1 and R2 can be in peri position with respect to each other, or, preferably, can be substituents of the same cycle.

Ar is advantageously selected from benzene and naphthalene moiety.

Preferably, the corrosion inhibitor for the cable of the present invention has the following general formula (Ia)

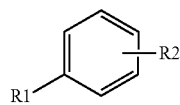

(Ia)

wherein R1 and R2 have the same meanings as defined in formula (I).

Preferably, R1 is a 1-hydroxy-tetrazol-5-yl group.

Preferably, R2 is a hydrogen atom, a 1-hydroxy-tetrazol-5-yl group, more preferably in ortho position with respect to R1, or a hydroxyl group (OH). More preferably, R2 is a hydrogen atom.

The corrosion inhibitor of formula (I) can be synthetized according to procedures known to the skilled person. See, for example, Tselinski, I. V. et al., *Russian Journal of Organic Chemistry*, Vol. 37, No. 3, 2001, pp. 430-436.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The cable of the present invention is a cable for power transmission/distribution comprising one or more cable cores. Preferably, the power cable of the invention has three cable cores.

The term of "cable core" indicates—in the present description and claims—a metallic electric conductor sequentially surrounded by an inner semiconducting layer, an insulating layer and an outer semiconducting layer, sequentially in contact with one another.

The electric conductor of the cable of the invention can be made of aluminium, copper or composites thereof. The conductor can be in form of a metal rod or of metal stranded wires.

Power cable of the present invention can further comprise a metal screen and an outer sheath.

The metal screen can be made of aluminium or copper in form of wires, braids, tapes, rods or longitudinally sealed foils. In a cable configuration a single metal screen encircled all of the cable cores, while in another configuration each cable core is surrounded by its screen so that the cable has as many cable cores as metal screens.

Preferably, the corrosion inhibitor of formula (I) is associated with a supporting material to form a corrosion inhibiting element where the corrosion inhibitor is in direct contact with the metallic element made of aluminium.

For example, the corrosion inhibitor of formula (I) for the cable of the invention can be absorbed in or adsorbed on the supporting material.

Supporting materials suitable for the present invention are preferably chemically/physically inert to water.

Supporting materials suitable for the present invention are preferably heat-resistant at least up to 100° C. Advantageously, the supporting material is heat-resistant up to 150° C., more preferably up to 200° C.

Supporting materials suitable for the invention are preferably polymeric material, either natural or synthetic.

For example, the supporting material can be cellulose, polyamide or polyesters.

The supporting material can be provided in various forms suitable for the cable construction, for example in form of threads, yarns, tapes or sheets.

The corrosion inhibitor of formula (I) can be bound onto the supporting material by means of an adhesive material, typically polyvinyl alcohol (PVA) or an acrylate resin. In particular, the supporting material can be moistened with a solution of an adhesive material, and then the corrosion inhibitor of formula (I) in form, for example, of powder, is sprinkled thereon and remains entrapped in the solution and, after drying, in the adhesive material.

Preferably, the average amount of corrosion inhibitor of formula (I) in direct contact with the metallic element made of aluminium to be protected ranges from $1 \times 10^{-3}$ g/cm$^2$ to $100 \times 10^{-3}$ g/cm$^2$ with respect to the surface of the metallic element.

In the cable of the present invention the corrosion inhibitor of formula (I), optionally supported in the corrosion inhibiting element, can be present within the metal wires of the electric conductor, at the interface between the conductor and the inner semiconductive layer, in contact with the metal screen, or at the interface of the metal screen and the inner semiconductive layer or the outer sheath.

In the cable of the invention a water barrier can be present in radial external position with respect to the cable core(s) and metal screen(s). The water barrier can be in form of a longitudinally sealed sheet of metal or plastic/metal laminate. The metal can be aluminium. In the case of a laminate, the plastic layer is generally positioned facing towards the outer jacket of the cable and in contact thereto.

In a cable according to the invention having a water barrier comprising an aluminium layer, the corrosion inhibitor of formula (I), optionally supported in the corrosion inhibiting element, can be present in contact with such aluminium layer.

In a second aspect, the present invention relates to a process for producing a power cable comprising a metallic element made of aluminium and a corrosion inhibiting element comprising a supporting material associated to a corrosion inhibitor of formula (I),

R1—Ar—R2 (I)

wherein R1 is a 1-hydroxy-tetrazol-5-yl group a 2-hydroxy-tetrazol-5-yl group, 1-acryloxy-tetrazol-5-yl group or 1-(2-carboxyethenyl)-tetrazol-5-yl group;

Ar is a monocyclic or bicyclic aromatic moiety; and

R2 is a hydrogen atom (H) or a 1-hydroxy-tetrazol-5-yl group, a 2-hydroxy-tetrazol-5-yl group, a hydroxyl group (OH), a vinyl group, an allyl group or a —O—CO—R4 group, where R4 is an alkenyl group having from 2 to 6 carbon atoms, the process comprising the steps of sprinkling the supporting material with said corrosion inhibitor of formula (I) in dry form or dissolved in a polar solvent to be subsequently evaporated, to provide said corrosion inhibiting element; and positioning the corrosion inhibiting element in direct contact with the metallic element made of aluminium.

Polar solvents particularly preferred for the process of the invention are water, acetone and hydroxyl-containing solvents such as isopropanol and ethanol.

Advantageously, the corrosion inhibitor of formula (I) is dissolved in the polar solvent at a concentration of up to 250-300 ppmw (parts per million weight).

Preferably, the solution of the corrosion inhibitor of formula (I) into the solvent is a saturated solution.

Following evaporation of the organic solvent, the supporting material with the corrosion inhibitor of formula (I) enters into the cable manufacturing through paying off station depending on the desired position of the marker within the cable.

BRIEF DESCRIPTION OF THE FIGURES

The present invention will be better understood by reading the following detailed description, given by way of example and not of limitation, to be read with the accompanying drawings, wherein.

DETAILED DESCRIPTION OF THE INVENTION

Figure 1:
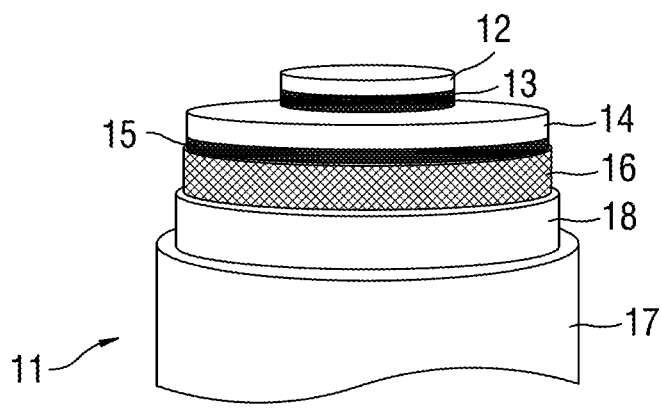
FIG. 1 shows a perspective view of a power cable according to an embodiment of the present invention.

FIG. 1 shows a perspective view of a power cable 11 according to an embodiment of the present invention.

The power cable 11 of FIG. 1 is a single core cable and comprises a conductor 12, an inner semiconductive layer 13, an insulating layer 14 and an outer semiconductive layer 15, which constitute the cable core. The cable core is surrounded by, a metal screen 16 and an outer sheath 17.

The conductor 12 generally comprises metal wires, which are preferably made of copper or aluminium, and which are braided together by using conventional technique.

The cross sectional area of the conductor 12 is determined in relationship with the power to be transported at the selected voltage.

Preferred cross sectional areas for power cables according to the present invention range from 16 mm$^2$ to 1,600 mm$^2$.

Inner semiconductive layer 13, insulating layer 14 and outer semiconductive layer 15 are made of polymeric materials.

Polymeric materials suitable for layers 13, 14 and 15 can be selected from the group comprising: polyolefins, copolymers of different olefins, copolymers of an olefin with an ethylenically unsaturated ester, polyesters and mixtures thereof.

Examples of suitable polymers are: polyethylene (PE), in particular low density PE (LDPE), medium density PE (MDPE), high density PE (HDPE), linear low density PE (LLDPE), ultra-low density polyethylene (ULDPE); polypropylene (PP) and copolymers thereof; elastomeric ethylene/propylene copolymers (EPR) or ethylene/propylene/diene terpolymers (EPDM); ethylene/vinyl ester copolymers, for example ethylene/vinyl acetate (EVA); ethylene/acrylate copolymers, in particular ethylene/methyl acrylate (EMA), ethylene/ethyl acrylate (EEA) and ethylene/butyl acrylate (EBA); ethylene/α-olefin thermoplastic copolymers or mechanical mixtures thereof.

In the case of inner semiconductive layer 13 and outer semiconductive layer 15, the above listed polymeric materials are added with an electro-conductive carbon black, for example electro-conductive furnace black or acetylene black, so as to confer semiconductive properties to the polymer material.

The insulating layer 14, inner semiconductive layer 13 and outer semiconductive layer 15 can be made of polymeric a thermoplastic material, preferably comprising a thermoplastic polymer material including a predetermined amount of a dielectric liquid. Example of thermoplastic insulating layers are disclosed in WO 02/03398, WO 02/27731, WO 04/066318, WO 07/048422 e WO 08/058572.

The metal screen 16 is made of a metal braid, made for example of aluminium, wrapped around the outer semiconductive layer 15.

The outer sheath 17 is preferably made of polymer material, such as polyvinyl chloride (PVC) or polyethylene (PE).

In the embodiment of FIG. 1, a corrosion inhibiting element 18, in form of a tape of supporting material bearing, on the surface facing the metal screen 16, a corrosion inhibitor of formula (I), is provided around and in contact with the metal screen 16.

Similarly, but not shown in FIG. 1, a corrosion inhibiting element can be provided, preferably in form of yarns, within the metal wires of the conductor 12 and/or between the inner semiconductive layer 14 and the conductor 12 and/or between the metal screen 16 and outer semiconductive layer 15.

Figure 2:
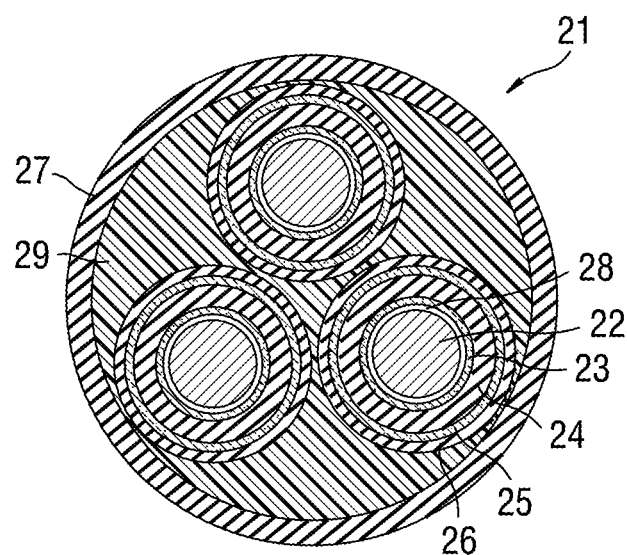
FIG. 2 shows a cross section of a power cable according to an embodiment of the present invention.

FIG. 2 shows another embodiment of the invention. FIG. 2 illustrates a cable 21 comprising three cable cores. Each cable core comprises a conductor 22, an inner semiconductive layer 23, an insulating layer 24 and an outer semiconductive layer 25. Each cable core is surrounded by a metal screen 26. An outer sheath 27 surrounds all of the three screened cable cores. Conductors 22 are each made of a solid aluminium rod.

The three screened cable cores are stranded and embedded into filler (or bedding) 29 which, in turn, is surrounded by an outer sheath 27. Outer sheath 27 can be made of the same material already disclosed in connection with outer sheath 17 of FIG. 1.

The materials of inner semiconductive layer 23, insulating layer 24, and outer semiconductive layer 25 can be as those already mentioned in connection with cable 11 of FIG. 1 for analogous cable portions.

In the embodiment of FIG. 2, a corrosion inhibiting element 28, in form of a tape supporting material bearing a corrosion inhibitor of formula (I) on the surface facing the conductor 22, is provided at the interface between conductor 22 and the inner semiconductive layer 23 of each cable core.

The corrosion inhibiting element 28 can be, alternatively or additionally, a yarn or tape wound positioned as already said in connection with cable 11 of FIG. 1.

Similarly, but not shown in FIG. 2, a corrosion inhibiting element can be provided in direct contact with metal screen 26, either between the metal screen 26 and outer semiconductive layer 25 or between the metal screen 26 and outer sheath 27.

The cable according to the present invention can be manufactured as disclosed above. The corrosion inhibiting element can be supplied using common process apparatus at a suitable step of the manufacturing process. For example, when the corrosion inhibiting element is to be positioned within the wires of an electric conductor, the inhibiting element in form of yarn(s) is stranded together with the wires. For example, when the corrosion inhibiting element is to be positioned between the electric conductor and the protecting layer (insulating layer or inner semiconducting layer), the corrosion inhibiting element in form of yarn(s) or tape is wound around the conductor before extruding said layer.

The following examples are intended to further illustrate the present invention, without however restricting it in any way.

Example 1

Synthesis of 5-phenyl-1-hydroxy-(1H)-tetrazole

Step 1: Preparation of N-Hydroxybenzimidoyl Chloride

Ethanol (30 mL) was poured in a 250 mL three-necked round-bottomed flask equipped with internal temperature probe, reflux condenser and nitrogen inlet. Benzoyl chloride (19.71 mL, 23.87 g, 0.17 moles) was added via syringe and the solution was stirred during the addition. Hydroxylamine hydrochloride (21.20 mL, 35.41 g, 0.51 moles) was added in one portion, followed by sodium hydroxide 97% (27.2 g, 0.68 moles). The reaction flask was placed in an oil bath and heated at 60° C. with stirring for 1 hour. The reaction flask was removed from the oil bath and was left to cool to ambient temperature.

The mixture was transferred to a single-necked round-bottom flask and concentrated by rotary evaporation at temperature of 45° C. and vacuum of 40 mbar.

The solid residue was transferred to a separatory funnel and was extracted three times with ethyl acetate. The combined organic layers were dried over $Na_2SO_4$. The drying agent was removed by filtration and then the organic layer was concentrated by rotary evaporation at temperature of 45° C. and vacuum of 40 mbar.

The solid residue was recrystallized from 60 mL of hexane at 5° C. for 2 hours to give crystals of N-hydroxybenzimidoyl chloride (20.21 g, 0.13 moles).

The resulting yield of reaction was of: 76.9%

Step 2: Preparation of N-Hydroxybenzimidoyl Azide

Sodium azide (9.75 g, 0.15 moles) dissolved in 10 mL of water was charged in a 250 mL three-necked round-bottomed flask equipped with internal temperature probe and reflux condenser. A solution of N-hydroxybenzimidoyl chloride (18.65 g, 0.12 moles) in 20 mL of methanol was added dropwise. The solution was placed in an oil bath and heated at 45° C. with stirring for 2.5 hours.

At the end of the reaction, the reaction flask was removed from the oil bath and was left to cool to ambient temperature.

The mixture was transferred to a single-necked round-bottom flask and the solvent of the solution was distilled off by rotary evaporation at temperature of 25° C. and vacuum of 55 mbar.

The residue was transferred to a separatory funnel and was extracted three times with diethyl ether (3×30 mL). The aqueous phase was further extracted three times with diethyl ether (3×30 mL).

The organic layers were dried with sodium sulfate filtered and evaporated to give N-hydroxybenzimidoyl azide (16.2 g, 0.10 moles).

The resulting yield of reaction was of: 89.9%

Step 3: Preparation of N-Acetoxybenzimidoyl Azide

N-Hydroxybenzimidoyl azide (16.2 g, 0.10 moles), dissolved in 10 mL of dichloromethane and pyridine (11.85 g, 12.12 mL, 0.15 moles) was charged in a 100 mL three-necked round-bottomed flask, equipped with internal temperature probe.

The solution was placed in an ice/ethanol bath and kept at 0° C. while stirring, subsequently acetyl chloride (10.19 g, 9.23 mL, 0.13 moles) was added dropwise. After the addition was completed, the mixture was stirred at room temperature for 4 hours. After reaction terminated, water (20 mL) was added to the mixture and distilled off to remove methylene chloride.

The obtained solid was filtered through a folded filter and left to dry overnight. The residue was extracted three times with toluene (3×10 mL) in a separatory funnel, to remove water and then the organic layer was dried with sodium sulfate and filtered. The solution was cooled to 0° C. for 2 hours to give crystals that were filtered and dried to 60° C. for 7 hours, to give crystals of N-acetoxybenzimidoyl azide (18.36 g, 0.09 moles).

The resulting yield of reaction was of: 92.3%

Step 4: Preparation of
5-phenyl-1-hydroxy-(1H)-tetrazole

N-acetoxybenzimidoyl azide (18.36 g, 0.09 mol) dissolved in 30 mL of diethyl ether, and zinc chloride were charged in a 100 mL single-necked round-bottomed flask. The solution was cooled to 20° C. with stirring for 2 hour to give de-acetylation and intramolecular cyclization. After reaction terminated, the solvent was removed by rotary evaporation at temperature of 30° C. and vacuum of 400 mbar, to obtain crystals of 5-phenyl-1-hydroxy-(1H)-tetrazole (11.34 g, 0.07 moles).

The resulting yield of reaction was of: 77.7%

Example 2

Evaluation of Corrosion Inhibiting Property

The 5-phenyl-1-hydroxy-(1H)-tetrazole corrosion inhibitor prepared in Example 1 was used to evaluate the corrosion inhibition of the aluminium shield 16 in the cable 11 of FIG. 1.

The three-electrode linear polarization resistance (LPR) method was used for evaluating the corrosion rate in presence and absence of inhibitor, as shown, for example, in http://www.gamry.com/application-notes/corrosion-coatings/corrosion-techniques-polarization-resistance/.

The three-electrode system was realized by using (i) a Standard Calomel Reference Electrode as a reference electrode, (ii) an aluminium screen, insulated with a polyester tape, as a working electrode (WE), and (iii) an aluminium wire of 1.6 mm diameter and 45 cm long, insulated with a polyester tape, inserted between the aluminium screen and a polyethylene outer sheath, as a counter electrode (CE).

For comparison purpose, two systems were realized, with and without corrosion inhibitor.

In the system with the corrosion inhibitor, the aluminium wire employed as counter electrode was previously immersed into tap water solution containing 0.7 mmoles/L of 5-phenyl-1-hydroxy-(1H)-tetrazole as corrosion inhibitor (I). In the system without the corrosion inhibitor, the aluminium wire employed as counter electrode was previously immersed into tap water.

Using the linear polarization resistance set up the material was polarized, typically on the order of ±10 mV, relative to the open circuit potential. As the potential of the working electrode was changed, a current was induced to flow between the working and counter electrodes, and the material's resistance to polarization was found by taking the slope of the potential versus current curve. This resistance was then used to find the corrosion rate of the material using the Stern-Geary equation.

Figure 3:
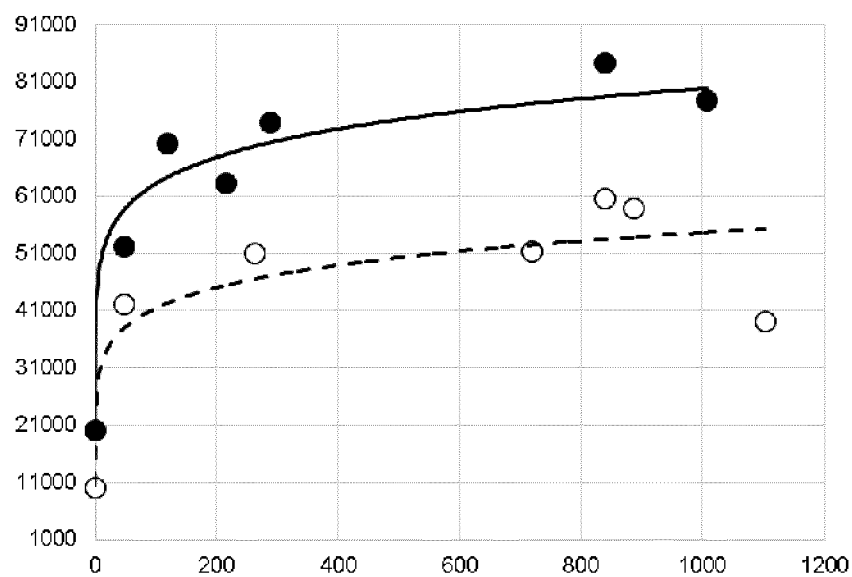
FIG. 3 shows a graph plotting the linear polarization resistance (LPR) variation over time with and without corrosion inhibitor, as described in Example 2.
Figure 4:
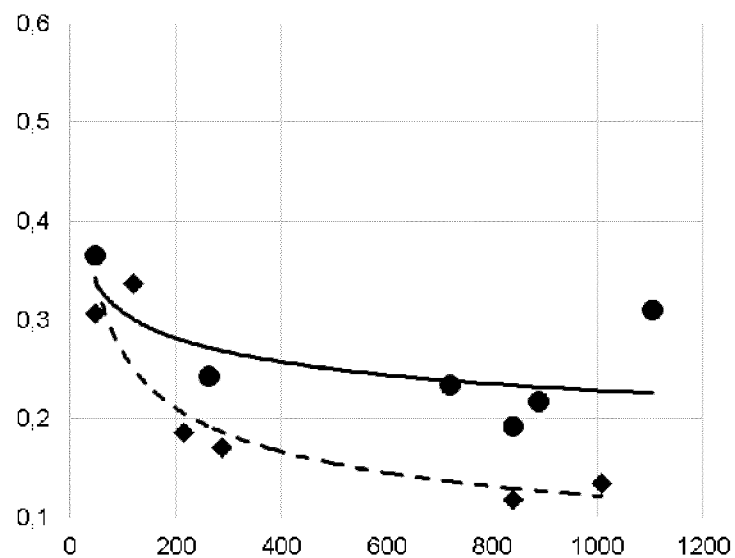
FIG. 4 shows a graph plotting the corrosion rate variation over time with and without corrosion inhibitor, as described in Example 2.

The results are illustrated in FIG. 3, showing a graph plotting the polarization resistance variation (ohm·cm$^2$) in ordinate over time (hours) in abscissa with (straight line and filled marker) and without (dashed line and empty marker) corrosion inhibitor, and in FIG. 4, showing a graph plotting the corrosion rate variation (as current density, μAmp/cm$^2$) in ordinate over time (hours) in abscissa with (dashed line and rhombic markers) and without (straight line and round markers) corrosion inhibitor.

The values of polarization resistance obtained with the sample with corrosion inhibitor were substantially higher than those obtained with the sample without corrosion inhibitor, as from FIG. 3. The results illustrated in FIG. 4 show that the calculated corrosion rate based on LPR method in the presence of inhibitor was about half the calculated corrosion rate in the absence of inhibitor.

These results confirmed that a corrosion inhibitor of formula (I) can effectively inhibit the corrosion of aluminium elements of power cables.

The invention claimed is:

1. Power cable comprising a metallic element made of aluminum, wherein a corrosion inhibitor is provided in direct contact with the metallic element, the corrosion inhibitor having the following general formula (I):

R1-Ar—R2    (I)

wherein R1 is a 1-hydroxy-tetrazol-5-yl group a 2-hydroxy-tetrazol-5-yl group, 1-acryloxy-tetrazol-5-yl group or 1-(2-carboxyethenyl)-tetrazol-5-yl group;

Ar is a monocyclic or bicyclic aromatic moiety; and

R2 is a hydrogen atom (H) or a 1-hydroxy-tetrazol-5-yl group, a 2-hydroxy-tetrazol-5-yl group, a hydroxyl group (OH), a vinyl group, an allyl group or a —O—CO—R4 group, where R4 is an alkenyl group having from 2 to 6 carbon atoms.

2. Power cable according to claim 1, wherein, when Ar is a monocyclic aromatic moiety and R2 is different from hydrogen atom, R1 and R2 are in ortho, meta, or para position with respect to each other.

3. Power cable according to claim 1, wherein, when Ar is a bicyclic aromatic moiety and R2 is different from hydrogen atom, R1 and R2 are in peri position with respect to each other, or are substituents of the same cycle.

4. Power cable according to claim 1, wherein the corrosion inhibitor has the following general formula (Ia)

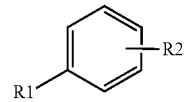

(Ia)

wherein R1 and R2 have the same meanings as defined in formula (I) of claim 1.

5. Power cable according to claim 1, wherein R1 is a 1-hydroxy-tetrazol-5-yl group and R2 is a hydrogen atom.

6. Power cable according to claim 1, wherein R2 is a hydrogen atom, a 1-hydroxy-tetrazol-5-yl group, preferably in ortho position with respect to R1, or a hydroxyl group (OH).

7. Power cable according to claim 1, wherein the corrosion inhibitor of formula (I) is associated with a supporting material to form a corrosion inhibiting element, where the corrosion inhibitor is in direct contact with the metallic element made of aluminum.

8. Power cable according to claim 7, wherein the corrosion inhibitor is absorbed in or adsorbed on the supporting material.

9. Power cable according to claim 1 wherein the corrosion inhibitor of formula (I) in direct contact with the metallic element made of aluminum is in an average amount of from 1×10$^{-3}$ g/cm$^2$ to 100×10$^{-3}$ g/cm$^2$ with respect to the surface of the metallic element.

10. Process for producing a power cable comprising a metallic element made of aluminum and a corrosion inhibiting element comprising a supporting material associated to a corrosion inhibitor of formula (I), R1-Ar—R2     (I)

wherein R1 is a 1-hydroxy-tetrazol-5-yl group or a 2-hydroxy-tetrazol-5-yl group;

Ar is a monocyclic or bicyclic aromatic moiety; and

R2 is a hydrogen atom (H) or a 1-hydroxy-tetrazol-5-yl group, a 2-hydroxy-tetrazol-5-yl group, a hydroxyl group (OH), a vinyl group, an allyl group or a —O—CO—R4 group, where R4 is an alkenyl group having from 2 to 6 carbon atoms;

the process comprising the steps of sprinkling the supporting material with said corrosion inhibitor of formula (I) in dry form or dissolved in a polar solvent to be subsequently evaporated, to provide said corrosion inhibiting element; and positioning the corrosion inhibiting element in direct contact with the metallic element made of aluminum.

11. Process according to claim 10 wherein the polar solvent is selected from water, acetone and hydroxyl-containing solvents.

12. Process according to claim 10 wherein the corrosion inhibitor is dissolved in the polar solvent at a concentration of up to 250-300 ppmw (parts per million weight).

* * * * *